R. WELLS.
METHOD OF EXTRACTING OILS AND THE LIKE.
APPLICATION FILED MAR. 11, 1915. RENEWED OCT. 22, 1917.
1,267,611.
Patented May 28, 1918.
2 SHEETS—SHEET 2.
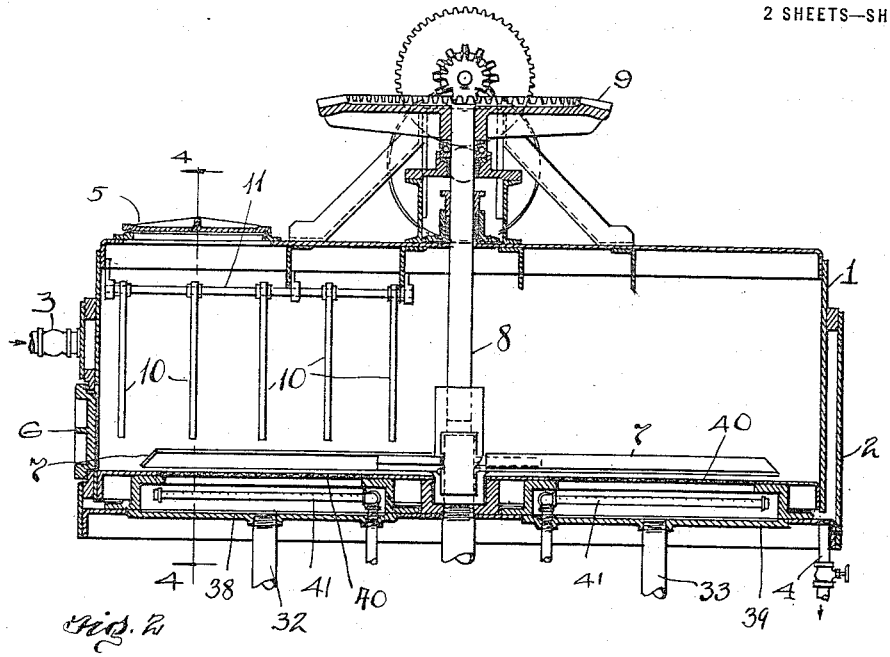
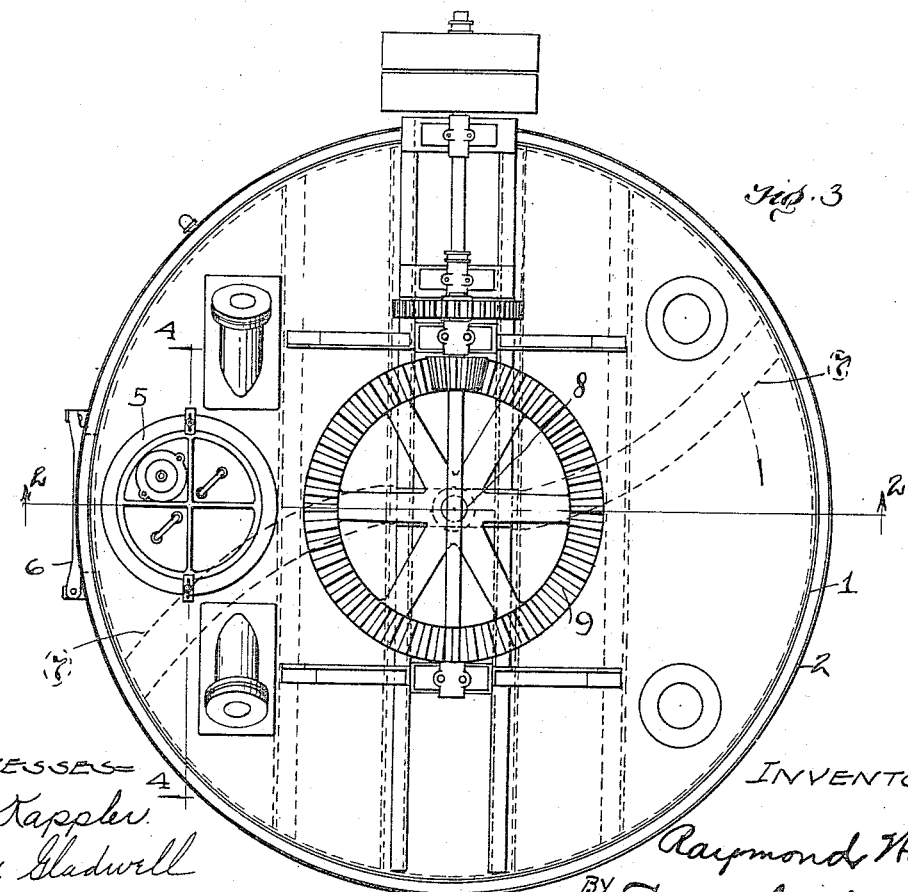

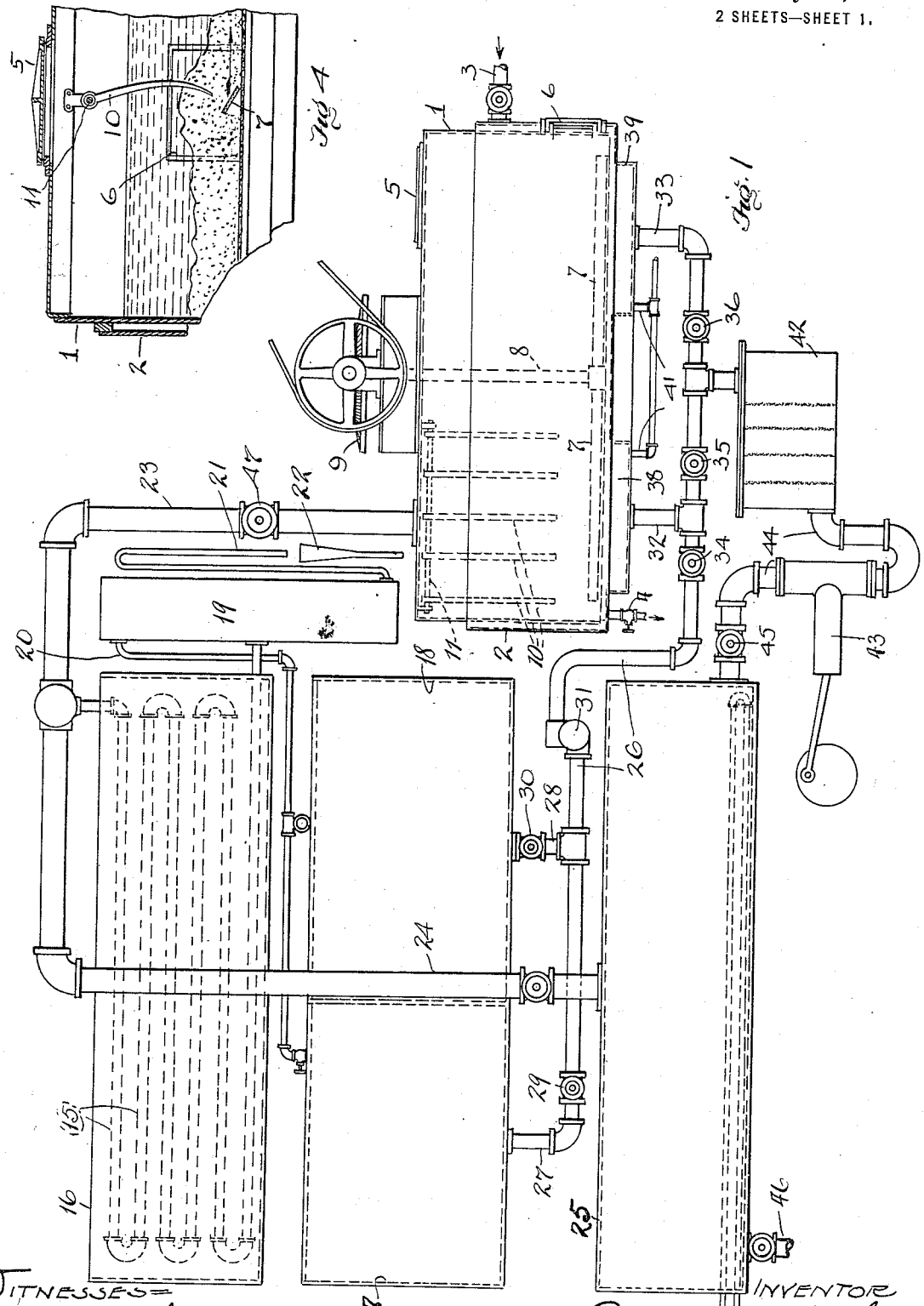

UNITED STATES PATENT OFFICE.

RAYMOND WELLS, OF HOMER, NEW YORK, ASSIGNOR TO COBWELL CORPORATION, OF CLEVELAND, OHIO, A CORPORATION OF VIRGINIA.

METHOD OF EXTRACTING OILS AND THE LIKE.

1,267,611.  Specification of Letters Patent.  Patented May 28, 1918.

Application filed March 11, 1915, Serial No. 13,718. Renewed October 22, 1917. Serial No. 197,996.

*To all whom it may concern:*

Be it known that I, RAYMOND WELLS, a citizen of the United States, and a resident of Homer, county of Cortland, and State of New York, have invented a new and useful Improvement in Methods of Extracting Oils and the like, of which the following is a specification, the principle of the invention being herein explained and the best mode in which I have contemplated applying that principle, so as to distinguish it from other inventions.

The present improved method or process of extracting oils and the like has regard more particularly to the rendering, drying, and disposal of materials in which the oils, greases or the like to be extracted are found in conjunction with a smaller or larger amount of water. Such method of disposal, in other words, is particularly adapted for the treatment of municipal garbage, abattoir, and rendering house offals, and refuse and raw materials of fish, vegetable or meat canneries. As indicated, however, the invention is not limited to the treatment of the particular materials named, but is equally adaptable for the extraction of the essential oils from seeds, beans and other oil-bearing vegetable substances.

The difficulties encountered by such a process of extraction and successfully overcome by the present invention, are well illustrated in the treatment given municipal garbage, for example, which contains a fairly large percentage of water (ranging as high as 70% by weight of the mass), the economical handling of this material being a serious problem facing all garbage reduction plants, and particularly municipal plants which cannot select the character of the raw material which they treat.

The first step in the treatment of such material as that just mentioned, involves the removal of the water, and to this end it has been customary to boil the raw mass of material in a digester until thoroughly cooked, drain off the free water, transfer to a drying mechanism and there heat until such water is practically all driven off in the form of steam, the residue being then treated with naphtha, or some other suitable solvent to extract the oils and greases which constitute the principal valuable products. Aside from successive rehandlings of the material involved in carrying out this old process, with accompanying dissemination of bad odors and other objectionable features, such process wastes valuable ingredients of the material and seriously impairs the quality of others. The cooking stage requires a relatively high temperature, one considerably above the boiling point of water, thereby causing ingredients such as sugars, starches and glues to be dissolved, which are accordingly lost when the water is drained off. Moreover, this high temperature also has a tendency to convert certain of the oils and greases present to fatty acids, which are less valuable than such oils and greases and so depreciate the final product.

The object of the present invention is to provide a mode of treatment and apparatus for use therein which will permit the elimination of the water without "boiling down" the original mass, and which will enable such elimination and the subsequent extraction of the desired oils and greases to be carried on in one and the same chamber, viz., that in which the raw material is originally placed. In this way, not only is the rehandling of the raw material avoided during the course of treatment, but I avoid entirely the production of the pasty, sticky mass referred to above, and the residue left after treatment is capable of being conveniently handled. The apparatus, moreover, is capable of construction and use in units of relatively small size, each of which operates with the same degree of efficiency and with the same expedition as would a larger plant. To the accomplishment of the foregoing and related ends, the invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:—

Figure 1 is a side elevational view, more or less diagrammatic in character, of an apparatus arranged for carrying out my improved process or method; Fig. 2 is a central vertical section of the reduction chamber forming part of such apparatus; Fig. 3 is a plan view of such chamber; and Fig. 4 is a broken sectional view of the same taken on a plane at right angles to that of Fig. 2, as indicated by the section lines 4—4 on said Fig. 2 and on Fig. 3.

My present improved method depends in part for its successful operation upon the fact that when two liquids of different boiling points are mixed together, the mixture will boil when raised to a temperature at which the combined vapor tensions of such liquids is equal to or greater than atmospheric or other superimposed pressure. Accordingly, by mixing with a liquid or melted solid medium not soluble in water, any material, such as one of those described above, the moisture, or water, present in such material will be driven off without raising the mass to what would under ordinary normal conditions be the boiling point of water; and this despite the fact that such added liquid or melted solid medium has a higher boiling point than water, so long as the combined vapor tension of such medium and the water at a given temperature exceed the atmospheric or other pressure superimposed on the liquid mixture. As a matter of fact the medium which I prefer to use for thus evaporating or driving off the water in the material being treated is one which has a somewhat higher boiling point than water, and which, although not soluble in water, will nevertheless dissolve the oils, greases, and the like, although where as in the case of municipal garbage for example, sugars and glues are present in the raw material, such medium should not dissolve these ingredients. Various media, some of which are at present more or less generally used for the extraction of oils and greases in the treatment of materials such as those in hand, after they have been relieved of their watery content by cooking in the objectionable fashion at present prevailing, possess the characteristics just described and may be satisfactorily used in my improved method, such for example as certain volatile distillates of petroleum and coal-tar like the naphtha previously mentioned, as well as the chlorinated products of methane, ethane and ethylene like carbon tetrachlorid, for example. It will be understood, of course, that any other solvent complying with the conditions in question may be substituted therefor, without departing from the spirit of the invention.

Even where a solvent having a higher boiling point than water is used, in this preliminary evaporating and cooking stage of my process, such solvent will ordinarily boil off more rapidly than the water, so that in order to completely remove or drive off the latter the amount of solvent originally introduced would have to be extremely large. I propose, however, to continually or periodically replenish the solvent in the reduction chamber, as it is evaporated off along with the water, so that only a relatively small body needs to be maintained in said chamber, enough in other words to completely immerse the material being sufficient.

A further distinguishing feature of my method is the treatment of the material, after the water has been evaporated in the manner just set forth, with a medium capable of dissolving the oil or grease to be extracted but having a lower boiling point than the medium used for the preliminary step. In other words, after the water has been evaporated off, the remaining body of solvent medium with its content of oil or grease, which will be a considerable one, relatively speaking, is drained off or otherwise removed as completely as possible, and then the remaining oil or grease is extracted with a lighter solvent, that is one boiling at a lower temperature than water. The advantage in this lies in the fact, first of all, that such solvent, whatever its boiling point, has to be separated by distillation from the extracted oil or grease, and that the lower its boiling point the less the amount of steam or other heat that will be required, and since approximately three times as much solvent is used in the washing stage as in the preliminary cooking stage it will be seen an important saving is made in this respect. Furthermore the residual material, left after the extraction of the oil and grease is completed is wet with the low-boiling solvent which can be driven off, or in other words recovered, in very much less time than such high-boiling solvent.

Such recovery of the solvent from the mass of residual material is not a negligible feature by any means, if the extraction is to be carried on on an economical basis, and a further feature of the present improved process relates to this stage of the operation. To effectually drive off and recover from the residual mass in question the solvent left therein after the extraction of oil or grease has been finished, I first raise such mass, together with the inclosing chamber as a whole, to a temperature considerably higher than the boiling point of water, or in other words that of the dry steam which I thereupon introduce into the mass and chamber. The effect of such steam, accordingly, is to volatilize the solvent without such steam being reduced in temperature to a point where condensation will occur. This is a point that, so far as I am aware, has been heretofore entirely overlooked in processes for recovering solvent under circumstances such as obtain in the present case. In other words it must be remembered that the steam in volatilizing the solvent is required to give up a very considerable amount of heat which becomes latent in the resulting solvent vapor, and it is therefore absolutely essential that an excess amount of heat be supplied from an extraneous source such as I have just described. The result of my special mode of treatment is not only that the volatilization of the solvent is complete, so that in the end only dry steam remains in the reduction chamber, but also the mass of residual material is at all times held at a temperature higher than the condensation point of steam so that it remains perfectly dry and may be so removed from the apparatus.

I have furthermore found that in order to treat materials such as those heretofore mentioned and especially municipal garbage, in a reduction chamber with a solvent either to preliminarily drive off the water in such material or to subsequently extract therefrom the content of oil or grease, such material requires to be disposed and manipulated in a special fashion, if anything like satisfactory results are to be secured. In the first place, instead of disposing such material in the form of a more or less compact mass in a cylindrical chamber as heretofore, I spread the same out in a relatively thin, flat layer. Then, instead of attempting to stir up such mass by cutting through the same, an operation which requires an excessive amount of power, and mechanism of extremely heavy construction, I simply agitate such layer on its opposite sides, that is on its bottom and top surfaces so as to more or less thoroughly intermix it with the solvent liquid.

Finally, in order to prevent the deposit of starches and like constituents of garbage, more especially on the bottom of the reduction chamber, I have found it advantageous to introduce into the reduction chamber a scouring material, such as animal bones or the like, in broken or fragmentary condition, which serve to accomplish the desired result without unduly abrading the walls in question.

Referring now to the illustrative apparatus shown in the several figures of the drawings previously described, it will be seen that I provide for the reception of the material to be treated a reduction chamber shown best in Figs. 2 and 3, in the form of a flat shallow receptacle 1, of circular outline, the size of which will depend of course upon the amount of the material which it is desired to treat at one time, that is at a single batch. The bottom and side walls of this chamber are inclosed in a supplemental chamber or jacket 2 to which steam or other equivalent heating medium may be admitted from a supply pipe 3, a drain pipe 4 being provided for the removal of any water of condensation in the case of steam, or to complete the circuit in the case of a non-condensable medium. The chamber 1 is provided in its top with a manhole 5, through which the material to be treated may be supplied, and at a convenient point in its side wall with a second manhole 6, through which the material may be removed after the treatment is completed.

For manipulating the material after it has been thus placed in the chamber for treatment, and a quantity of solvent medium introduced as will be presently described, a pair of radially extending curved arms 7 are provided, being carried by a vertical shaft 8, the upper end of which extends above the top of the chamber where it is connected with suitable driving means 9. The form of these arms 7 is shown in the plan in Fig. 3, and in transverse section in Fig. 4, from which latter figure it will be seen that they incline like a plow share and fit the bottom of the chamber closely, so that their only effect as they are rotated is to slide along such bottom and lift successive portions of the layer of material as they pass thereunder and thus impart an undulatory movement to such layer. In other words, these arms do not cut through the material in any sense.

As a coöperative agency with the aforesaid arms, I provide a series of pivotal arms 10 disposed at spaced intervals along a radially extending shaft 11 as shown in Fig. 2, the lower ends of such arms being curved and dangling freely as shown in Fig. 4. The length of the arms is made such that their lower ends will engage the layer of material as the latter is undulated and carried in the general circular direction indicated by the arrow in Fig. 3, more or less stirring up the upper surface of such layer. These arms, however, no more than in the case of the radial rotating arms 7, obviously do not cut through the material.

Supported preferably at a higher level than the chamber is a condenser consisting of several coils of pipe 15 in a suitable cooling tank 16 and below said condenser is a liquid storage tank or chamber, or rather a pair of such chambers 17 and 18, formed by dividing the larger chamber into two by means of a transverse partition. The discharge end of the condenser coil 15 is connected with a gravity separator 19 which is adapted to overflow from its upper end through a pipe 20 into either of said storage chambers, a siphon overflow pipe 21 being connected with the lower end of said separator, and discharging into a waste pipe 22.

The condenser is connected, by means of one pipe 23 with the reduction chamber, and by means of another pipe 24 with a still 25, the function of which latter will presently appear. The two storage tanks 17 and 18 are adapted to discharge their contents into the reduction chamber through a pipe line 26 having branched connections 27 and 28 with said chambers, respectively. Such connections are in turn respectively controlled by valves 29 and 30 and said line 26 further has a pump 31 therein so as to assist or substitute for such flow as might occur under the influence of gravity alone. Branched connections 32 and 33 are similarly provided between the other end of this pipe and said reduction chamber which are controlled by valves 34, 35 and 36 as shown, these connections entering the bottom of the chamber through supplemental chambers 38 and 39, respectively, as shown in Figs. 1 and 2, which are separated from the interior of the chamber by foraminous partitions 40, and are of sufficient size to receive open steam supply pipes 41. Connected with said pipe 26 between branched connections 32 and 33 is a strainer or mud-drum 42, which is in turn connected with the still 25 previously referred to, a suction pump 43 being interposed in the connecting line 44 which is further controlled by a suitable valve 45.

By means of the foregoing arrangement of connections between the storage tanks 17 and 18 and reduction chamber 1, and between the latter and the still 25, it will be observed that solvent from either of said storage tanks may be supplied to the reduction chamber by means of the pipe 26 branched connections 32 and supplemental chamber 38, the pump 31 being utilized to force such liquid into the chamber against gravity or against any vapor pressure which may exist in said chamber. Similarly the chamber may be drained through both connections 32 and 33 simultaneously and then through the mud-drum 42 into said still 25, such draining action being facilitated or induced by the suction pump 43 in the line 44 connecting said drum with said still.

The general mode of operation of the foregoing apparatus in carrying out my improved method or process of extraction need be only briefly set forth in view of the general description heretofore given of said method.

The material to be treated is placed in the reduction chamber 1 so as to uniformly fill the same to from one-third to one-half of its height. Then the solvent selected for preliminarily treating the material is flowed into said chamber from the corresponding storage tank to totally immerse such material. Steam being now admitted or having been previously admitted to the jacket and the stirring device having been set in motion, the material and such solvent are thoroughly commingled and as soon as a temperature is reached such as to cause the combined vapor pressures of such solvent and the water contained in the material to equal the pressure above the mass, water and solvent will begin to pass over into the condenser 15. From the condenser such water and solvent, restored to liquid form, pass to the separator 19 where they are separated, the water overflowing to waste and the solvent back to its appropriate storage tank. As the liquid level in the reduction chamber falls, more of such solvent is added from time to time, or preferably continuously by the action of the pump 31, so as to maintain the body thereof in the chamber substantially constant. When it is found that the water is substantially entirely driven off, the foregoing operation is stopped, the connections between the chamber and the condenser and storage tank respectively closed, and the body of solvent in said chamber withdrawn through the supplemental chambers 38 and 39 and mud-drum 42 into the still 25. Such body of solvent will carry with it the major portion of the oil, grease or other ingredient to be extracted, and is separated from the latter in the still by being boiled off, the solvent vapors being carried to the condenser and thence returned to the proper chamber, as will be readily understood.

Thereupon the connections between the chamber and the still are closed and a supply of solvent from the other storage tank admitted into the chamber, there mixed with the residual material and then withdrawn through the mud drum to the still, dissolving or washing out incidentally a further portion of the oil or grease in such material. The material may be subjected to as many successive washings as found desirable until in the end practically all of the oil or grease therein has been extracted, the solvent being distilled off as desired, condensed and returned to its appropriate storage tank, so as to be used over and over again. The oil or grease collecting in the still may of course be withdrawn, whenever desired, through a discharge pipe 46 provided for the purpose.

It remains to recover from the residual material in the chamber the solvent which may be absorbed therein, and to this end steam is supplied to the jacket until a higher temperature than previously used is attained, all as heretofore described. Accordingly, when live steam is introduced through the connections 41 and supplemental chambers 38 and 39, such steam is not condensed upon coming in contact with the material, but remains volatile, at the same time vaporizing the solvent in such material and carrying the same along into the condenser 15, the valve 47 in the line 23 being open for this purpose. There remains finally only dry steam in the chamber, and before this is condensed the material is removed by opening the manhole 6 in the side wall.

From the foregoing description of the operation of the illustrative apparatus designed for carrying out my improved process or method of extraction, it will be obvious that practically all of the disadvantages heretofore attendant upon the treatment of materials of the kind in hand, and particularly in the treatment of garbage materials for the extraction of their valuable ingredients are obviated. The material remains throughout the whole process in one and the same chamber, that into which it is initially placed, requiring no transferring from one receptacle to another. There is consequently no opportunity for the escape of offensive odors such as have always made a garbage reduction plant a nuisance to the neighborhood in which it is located. Of equal, if not greater, practical importance is the fact that it is not necessary in carrying out my improved method or process, to utilize the high temperatures which have heretofore been necessarily employed. Even in the cooking stage, that in which the water in the material is released and evaporated off, it is necessary to go but little above the boiling point of water; in fact, the major portion of this stage is carried on at a temperature less than such boiling point as has already been explained. The result of the foregoing is that sugars, glue, and like valuable constituents are not washed out and thrown away, as is the prevailing method of disposition, but these valuable ingredients are left in the residual material. The oils, greases and the like, moreover, originally found in the material, are all recovered substantially in unaltered condition, none being reduced to fatty acids which have a much lower commercial value.

While the foregoing advantages appear particularly strong in connection with the handling of garbage material, it will, of course, be understood that such advantages are equally important in the handling of various other materials coming within the scope of an extraction process of the kind in hand.

Other modes of applying the principle of my invention may be employed instead of the one explained, change being made as regards the process herein disclosed, provided the step or steps stated by any one of the following claims or the equivalent of such stated steps or steps be employed.

I therefore particularly point out and distinctly claim as my invention:—

1. In a method of extracting oils and the like from a material also containing water, the steps which consist in mixing such material to be treated in a suitable chamber with a medium insoluble in water but capable of dissolving the oil or other ingredient to be extracted; raising the temperature of the mass to a point where the combined vapor tensions of such solvent and water are equal to or greater than the vapor pressure in such chamber, thereby simultaneously evaporating such water with such medium; and adding more of such medium so as to maintain the body thereof in such chamber substantially constant.

2. In a method of extracting oils and the like from a material also containing water, the steps which consist in mixing such material to be treated in a suitable chamber with a medium insoluble in water but capable of dissolving the oil or other ingredient to be extracted; raising the temperature of the mass to a point where the combined vapor tensions of such solvent and water are equal to or greater than the vapor pressure in such chamber, thereby simultaneously evaporating such water with such medium; adding more of such medium, so as to maintain the body thereof substantially constant; and then drawing off the body of such medium with dissolved content of oil or the like after the water has been substantially all evaporated.

3. In a method of extracting oils and the like from a material also containing water, the steps which consist in mixing such material to be treated in a suitable chamber with a medium insoluble in water but capable of dissolving the oil or other ingredient to be extracted; raising the temperature of the mass to a point where the combined vapor tensions of such solvent and water are equal to or greater than the vapor pressure in such chamber, thereby simultaneously evaporating such water with such medium; adding more of such medium, so as to maintain the body thereof substantially constant; drawing off the body of such medium with dissolved content of oil or the like after the water has been substantially all evaporated; and then washing the residual material with more solvent medium to extract any oil or the like remaining therein.

4. In a method of extracting oils, or the like, from a material also containing water, the steps which consist in mixing such material in a suitable chamber with a medium capable of dissolving the oil or other ingredient to be extracted, but insoluble in, and having a higher boiling point than, water; raising the temperature of the mass to a point where the combined vapor tensions of such solvent and water are equal to or greater than the vapor pressure in such chamber, thereby simultaneously evaporating such water with such medium; drawing off the body of such medium with dissolved content of oil or the like after the water has been substantially all evaporated; and then washing the residual material with a solvent material having a lower boiling point than water.

5. In a method of extracting oils, or the like, from a material also containing water, the steps which consist in mixing such material in a suitable chamber with a medium capable of dissolving the oil or other ingredient to be extracted, but insoluble in, and having a higher boiling point than, water; raising the temperature of the mass to a point where the combined vapor tensions of such solvent and water are equal to or greater than the vapor pressure in such chamber, thereby simultaneously evaporating such water with such medium; adding more of such medium, so as to maintain the body thereof in such chamber substantially constant; drawing off the body of such medium with dissolved content of oil or the like after the water has been substantially all evaporated; and then washing the residual material with a solvent material having a lower boiling point than water.

6. In a method of extracting oils, or the like, from a material also containing water, the steps which consist in mixing such material in a suitable chamber with a medium capable of dissolving the oil or other ingredients to be extracted, but insoluble in, and having a higher boiling point than, water; raising the temperature of the mass to a point where the combined vapor tensions of such solvent and water are equal to or greater than the vapor pressure in such chamber, thereby simultaneously evaporating such water with such medium; adding more of such medium, so as to maintain the body thereof in such chamber substantially constant; drawing off the body of such medium with dissolved content of oil or the like after the water has been substantially all evaporated; then washing the residual material with a solvent material having a lower boiling point than water; and finally recovering any of such last named solvent remaining in such material.

7. In a method of extracting oils, or the like, from a material also containing water, the steps which consist in mixing such material in a suitable chamber with a medium capable of dissolving the oil or other ingredient to be extracted, but insoluble in, and having a higher boiling point than, water; raising the temperature of the mass to a point where the combined vapor tensions of such solvent and water are equal to or greater than the vapor pressure in such chamber, thereby simultaneously evaporating such water with such medium; adding more of such medium, so as to maintain the body thereof in such chamber substantially constant; drawing off the body of such medium with dissolved content of oil or the like after the water has been substantially all evaporated; then washing the residual material with a solvent material having a lower boiling point than water; and finally recovering any of such last named solvent remaining in such material by raising such material to a temperature considerably above the condensation point of steam and thereupon subjecting the same to the action of live steam.

8. In a method of extracting oils, or the like, from a material also containing water, the steps which consist in evaporating off such water by heating said material along with a solvent medium having a higher boiling point than water; and then extracting such oils, or the like, by washing such material with a solvent medium having a lower boiling point than water.

9. In a method of the character described, the steps which consist in disposing the material to be treated in a chamber in a relatively thin layer, that is in a layer considerably less in vertical than in horizontal extent; submerging such layer of material in a suitable solvent medium; and then imparting an undulatory movement to such layer, without moving the same bodily, by vertically displacing successive portions thereof from beneath, substantially as described.

10. In a method of the character described, the steps which consist in disposing the material to be treated in a chamber in a relatively thin layer, that is in a layer considerably less in vertical than in horizontal extent; submerging such layer of material in a suitable solvent medium; and then moving an arm underneath such layer, so as vertically to displace successive portions thereof and thereby impart an undulatory movement to such layer, without moving the same bodily.

11. In a method of the character described, the steps which consist in disposing the material to be treated in a chamber in a relatively thin layer, that is in a layer considerably less in vertical than in horizontal extent; submerging such layer of material in a suitable solvent medium; moving an arm underneath such layer, so as vertically to displace successive portions thereof and thereby impart an undulatory movement to such layer, without moving the same bodily; and at the same time stirring the upper surface of such layer.

12. In a method of the character described, the steps which consist in placing the material to be treated in a chamber, agitating such material by moving an arm along the floor of such chamber, and mingling with such material a quantity of relatively hard fragmentary material, substantially as described.

13. In a method of the character described, the steps which consist in placing the material to be treated in a chamber, agitating such material by moving an arm along the floor of such chamber, and mingling with such material a quantity of broken bones or like fragmentary material adapted to scour but not abrade such floor or the walls of such chamber.

Signed by me, this 3d day of March, 1915.

RAYMOND WELLS.

Attested by—
JAMES G. KELLEY,
WILFRED M. PECK.